(12) United States Patent
Zheng et al.

(10) Patent No.: US 10,637,242 B2
(45) Date of Patent: Apr. 28, 2020

(54) MICRO-GRID DYNAMIC STABILITY CONTROL SYSTEM AND MICRO-GRID DYNAMIC STABILITY CONTROL METHOD

(71) Applicant: JIANGSU GOLDWIND SCIENCE & TECHNOLOGY CO., LTD., Yancheng, Jiangsu (CN)

(72) Inventors: Dehua Zheng, Beijing (CN); Wei Zhang, Beijing (CN); Dan Wei, Beijing (CN); Fudong Qiu, Beijing (CN)

(73) Assignee: JIANGSU GOLDWIND SCIENCE & TECHNOLOGY CO., LTD., Jiangsu (CN)

( * ) Notice: Subject to any disclaimer, the term of this patent is extended or adjusted under 35 U.S.C. 154(b) by 55 days.

(21) Appl. No.: 15/760,017

(22) PCT Filed: Jun. 29, 2017

(86) PCT No.: PCT/CN2017/090690
§ 371 (c)(1),
(2) Date: Mar. 14, 2018

(87) PCT Pub. No.: WO2018/120699
PCT Pub. Date: Jul. 5, 2018

(65) Prior Publication Data
US 2019/0052082 A1    Feb. 14, 2019

(30) Foreign Application Priority Data
Dec. 28, 2016    (CN) .......................... 2016 1 1233633

(51) Int. Cl.
*H02J 3/18*    (2006.01)
*H02J 3/16*    (2006.01)
*H02J 3/38*    (2006.01)

(52) U.S. Cl.
CPC .................. *H02J 3/18* (2013.01); *H02J 3/16* (2013.01); *H02J 3/381* (2013.01);
(Continued)

(58) Field of Classification Search
CPC ...... H02J 3/16; H02J 3/18; H02J 3/381; H02J 2003/388; H02J 3/382; Y02P 80/14; Y02E 40/30; Y02E 40/34
(Continued)

(56) References Cited

U.S. PATENT DOCUMENTS

2011/0248569 A1    10/2011    Son et al.
2012/0193915 A1    8/2012    Liu et al.
(Continued)

FOREIGN PATENT DOCUMENTS

CN    102738786 A    10/2012
CN    102882229 A    1/2013
(Continued)

OTHER PUBLICATIONS

International Search Report dated Oct. 10, 2017; PCT/CN2017/090690.
(Continued)

*Primary Examiner* — Hal Kaplan

(57) ABSTRACT

A micro-grid dynamic stability control system includes: a micro-grid dynamic stability control device, configured to calculate a power factor based on a real-time voltage and current of a bus; a central control device, configured to transmit a reactive power control instruction if the power factor is lower than a predefined threshold; and at least one local control device, configured to transmit a control signal to the micro-grid dynamic stability control device and at least one distributed power supply controlled by the at least one local control device. In response to the control signal, the micro-grid dynamic stability control device compensates (Continued)

the voltage of the bus with droop control, and the at least one distributed power supply outputs a reactive power to the bus to increase the power factor of the bus.

17 Claims, 12 Drawing Sheets

(52) U.S. Cl.
 CPC ......... *H02J 2003/388* (2013.01); *Y02E 40/30* (2013.01); *Y02E 40/34* (2013.01); *Y02P 80/14* (2015.11)

(58) Field of Classification Search
 USPC .................................................. 307/125, 84
 See application file for complete search history.

(56) References Cited

U.S. PATENT DOCUMENTS

| | | | |
|---|---|---|---|
| 2013/0234521 | A1 | 9/2013 | Eom et al. |
| 2013/0250635 | A1 | 9/2013 | Sivakumar et al. |
| 2015/0102674 | A1 | 4/2015 | Rudolph et al. |

FOREIGN PATENT DOCUMENTS

| | | |
|---|---|---|
| CN | 103138290 A | 6/2013 |
| CN | 103414207 A | 11/2013 |
| CN | 103825279 A | 5/2014 |
| CN | 104836334 A | 8/2015 |
| CN | 105914754 A | 8/2016 |
| CN | 106532730 A | 3/2017 |
| EP | 2482421 A1 | 8/2012 |
| KR | 101132107 B1 | 4/2012 |
| KR | 101176100 B1 | 8/2012 |
| WO | 2014171044 A1 | 10/2014 |

OTHER PUBLICATIONS

The First Chinese Office Action dated Jun. 28, 2018; Appln. No. 201611233633.2.
A. Arulampalam, et al; "Control of power electronic interfaces in distributed generation Microgrids", Int. J. Electronics, vol. 91, No. 9, Sep. 2004, pp. 503-523, XP002689035.
The Extended European Search Report dated Mar. 7, 2019; Appln. No. 17840585.8.
Australian Office Action dated Apr. 4, 2019; Appln. No. 2017314290.
First Korean Office Action dated Apr. 4, 2019; Appln. No. 10-2018-7007856.

MICRO-GRID DYNAMIC STABILITY CONTROL SYSTEM AND MICRO-GRID DYNAMIC STABILITY CONTROL METHOD

CROSS REFERENCE TO RELATED APPLICATIONS

This application is a National Phase application of PCT international patent application PCT/CN2017/090690, filed on Jun. 29, 2017 which claims priority to Chinese Patent Application No. 201611233633.2, titled "MICRO-GRID DYNAMIC STABILITY CONTROL SYSTEM AND MICRO-GRID DYNAMIC STABILITY CONTROL METHOD", filed with the Chinese Patent Office on Dec. 28, 2016, both of which are incorporated herein by reference in their entireties.

FIELD

The present disclosure relates to the field of micro-grid control, and in particular to a micro-grid dynamic stability control system and a micro-grid dynamic stability control method.

BACKGROUND

Distributed generation has been widely used in recent years. A micro-grid, including a decentralized distributed generation system of small capacity (abbreviated as micro power supply), an energy storage system, a load and the like, gets a lot of attention.

The micro-grid includes multiple kinds of distributed power supply (such as a photovoltaic power station, a wind turbine, a diesel engine and the like), there are disadvantages of intermittency of the generation, needing a support of the grid, needing to be disconnected when a failure occurs and instability of a power quality. Therefore, a micro-grid dynamic stability control system is required to control stability of the voltage of the micro-grid, improve the power quality and realize a seamless switch between a grid-disconnected state and a grid-connected state.

SUMMARY

According to a first aspect of the present disclosure, a micro-grid dynamic stability control system is provided. The micro-grid dynamic stability control system includes: a micro-grid dynamic stability control device, a central control device and at least one local control device. The micro-grid dynamic stability control device is configured to acquire a real-time voltage and a real-time current of a bus and calculate a power factor based on the real-time voltage and the real-time current. The central control device is configured to receive the power factor and transmit a reactive power control instruction in a case that the power factor is lower than a predefined threshold. The at least one local control device is configured to receive the reactive power control instruction and transmit a control signal to the micro-grid dynamic stability control device and at least one distributed power supply controlled by the at least one local control device. The micro-grid dynamic stability control device, in response to the control signal, compensates the voltage of the bus by means of droop control, and the at least one distributed power supply, in response to the control signal, outputs a reactive power to the bus to increase the power factor of the bus.

According to a second aspect of the present disclosure, a micro-grid dynamic stability control method is provided. The micro-grid dynamic stability control method includes: acquiring, by a micro-grid dynamic stability control device, a real-time voltage and a real-time current of a bus and calculating, by the micro-grid dynamic stability control device, a power factor based on the real-time voltage and the real-time current; and transmitting, by a central control device, a reactive power control instruction to control the micro-grid dynamic stability control device to compensate the voltage of the bus by means of droop control and to control at least one distributed power supply to output a reactive power to the bus to increase the power factor, in a case that the power factor is lower than a predefined threshold.

DETAILED DESCRIPTION OF EMBODIMENTS

Detailed embodiments of the disclosure are disclosed herein according to the requirement, and it should be understood that the disclosed embodiments are only examples of the disclosure, and the disclosure can be achieved in a variety of alternative forms. Accompanying drawings are not required to be drew with scaling; some features may be exaggerated or minimized to show the details of specific components. Therefore, the specific structures and function details disclosed herein should not be understood as a restriction, but only used as the representative basis for teaching those skilled in art to use the disclosure in various forms.

Figure 1:
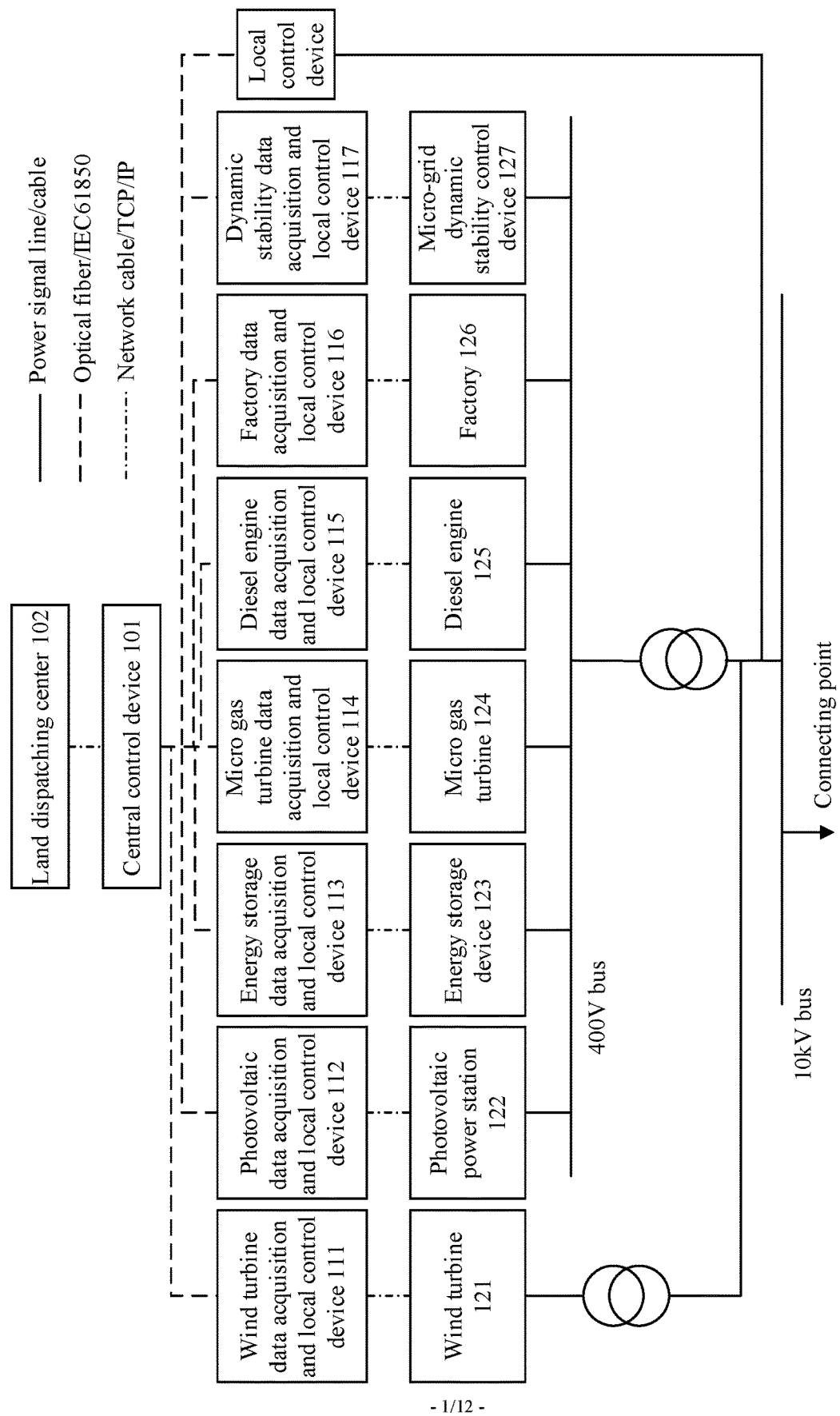
FIG. 1 is a block diagram of a micro-grid dynamic stability control system according to an exemplary embodiment of the present disclosure.

FIG. 1 is a block diagram of a micro-grid dynamic stability control system according to an exemplary embodiment of the present disclosure. The micro-grid dynamic stability control system includes a central control device 101, a land dispatching center 102, a wind turbine data acquisition and local control device 111, a photovoltaic data acquisition and local control device 112, an energy storage data acquisition and local control device 113, a micro gas turbine data acquisition and local control device 114, a diesel engine data acquisition and local control device 115, a factories data acquisition and local control device 116, a dynamic stability data acquisition and local control device 117, a wind turbine 121, a photovoltaic power station 122, an energy storage device 123, a micro gas turbine 124, a diesel engine 125, a factory 126 and a micro-grid dynamic stability control device 127.

Reference is made to FIG. 1, the central control device 101 is connected to the land dispatching center 102 through a transmission control protocol (Modbus TCP), and is connected to each local control device (such as the wind turbine data acquisition and local control device 111, the photovoltaic data acquisition and local control device 112, the energy storage data acquisition and local control device 113, the micro gas turbine data acquisition and local control device 114, the diesel engine data acquisition and local control device 115, the factory data acquisition and local control device 116, the dynamic stability data acquisition and local control device 117 and the like) according to a global common standard for power system automation field (IEC61850). Each local control device is connected to a corresponding distributed power supply (such as the wind turbine 121, the photovoltaic power station 122, the energy storage device 123, the micro gas turbine 124, the diesel engine 125, the factory 126) and the micro-grid dynamic stability control device 127 through Modbus TCP. The photovoltaic power station 122, the energy storage device 123, the micro gas turbine 124, the diesel engine 125, the factory 126 and the micro-grid dynamic stability control device 127 are connected to a 400V bus.

Figure 2:
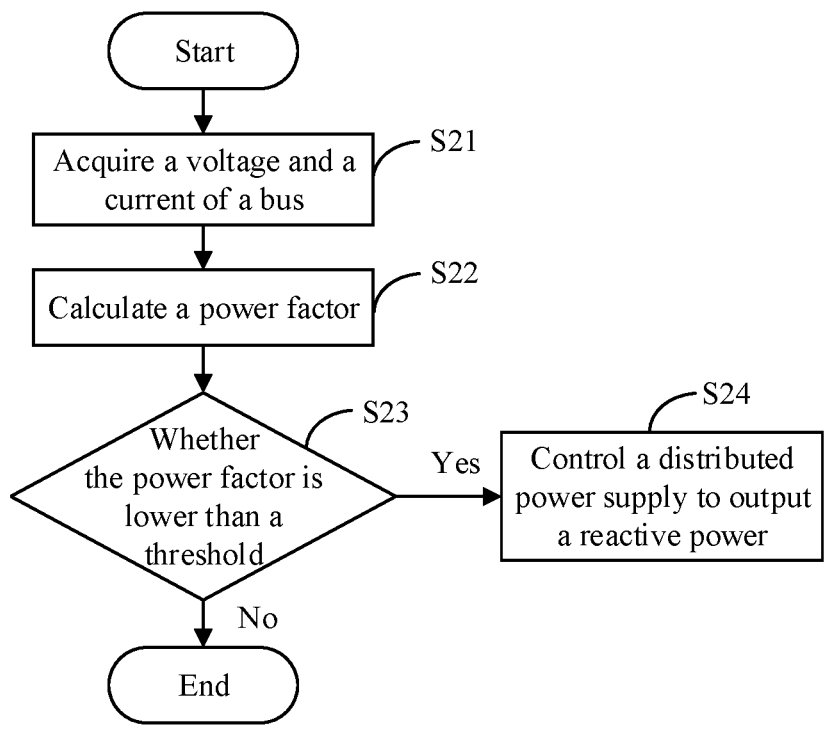
FIG. 2 is a flowchart of a method for compensating a voltage of the bus in a micro-grid dynamic stability control system according to an exemplary embodiment of the present disclosure.

FIG. 2 is a flowchart of a method for compensating a voltage of the bus in a micro-grid dynamic stability control system according to an exemplary embodiment of the present disclosure.

Reference is made to FIG. 2, the micro-grid dynamic stability control device 127 may acquire a real-time voltage and a real-time current of the 400V bus (S21), and calculate a power factor of the 400V bus (S22). Then, the micro-grid dynamic stability control device 127 may feedback the calculated power factor to the central control device 101 through the local control device 117. The central control device 101 determines whether the power factor is lower than a predefined threshold (S23). In a case that the power factor is lower than the predefined threshold, the central control device 101 may transmit a reactive power control instruction to each local control device (the photovoltaic data acquisition and local control device 112, the energy storage data acquisition and local control device 113, the micro gas turbine data acquisition and local control device 114, the diesel engine data acquisition and local control device 115, the factory data acquisition and local control device 116, the dynamic stability data acquisition and local control device 117). Each local control device may transmit a control signal to the corresponding distributed power supply and the micro-grid dynamic stability control device 127 (S24).

After the distributed power supply (the photovoltaic power station 122, the energy storage device 123, the micro gas turbine 124, the diesel engine 125, the factory 126) receives the control signal, the distributed power supply may output a reactive power to the 400V bus to increase the power factor of the voltage of the bus. After the micro-grid dynamic stability control system receives the control signal, a droop control is adopted to compensate the voltage of the bus.

Figure 3:
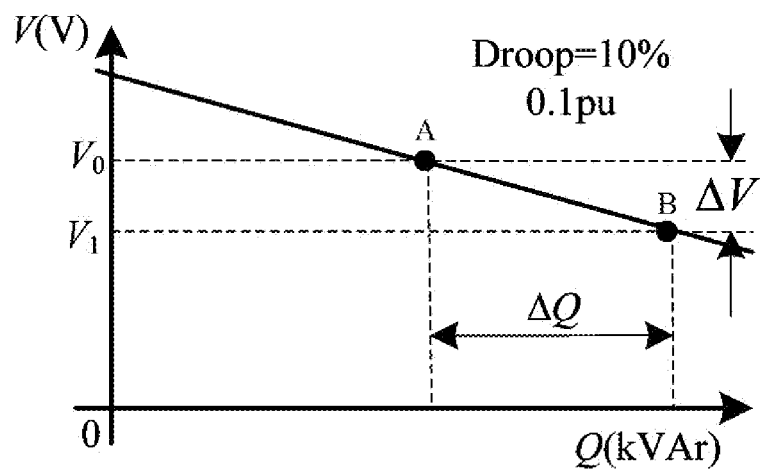
FIG. 3 is a schematic graph of a voltage droop control according to an exemplary embodiment of the present disclosure.
Figure 4:
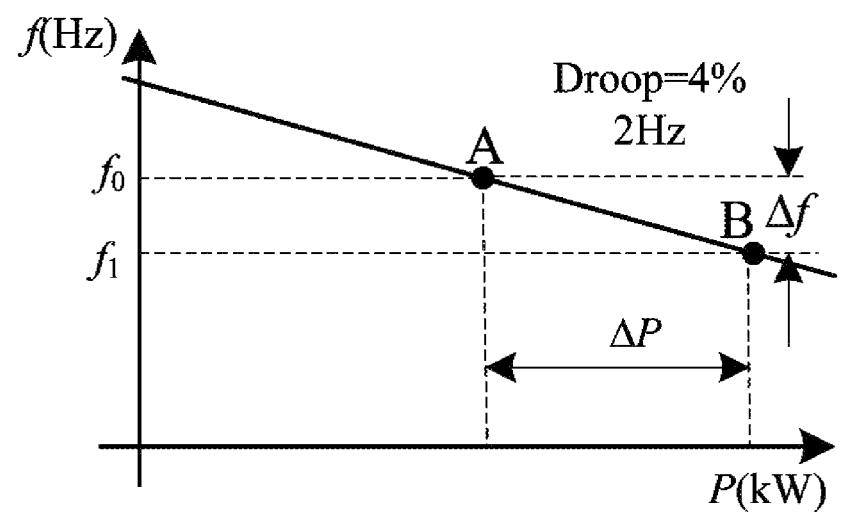
FIG. 4 is a schematic graph of a frequency droop control according to an exemplary embodiment of the present disclosure.

FIG. 3 is a schematic graph of a voltage droop control according to an exemplary embodiment of the present disclosure. FIG. 4 is a schematic graph of a frequency droop control according to an exemplary embodiment of the present disclosure.

Reference is made to FIG. 3, in a case that the voltage of the 400V bus is higher than a standard value $V_0$, each distributed power supply may absorb the reactive power, thereby decreasing the voltage to the standard value $V_0$. In a case that the voltage of the 400V bus is lower than the standard value $V_0$, each distributed power supply may output the reactive power, thereby increasing the voltage to the standard value $V_0$.

In a case that the micro-grid system fails, the voltage drops to $V_1$ in a sudden, the operation state of the system may change from the state at the point A to the state at the point B, at this time, more reactive power is outputted to support the voltage of the bus. In the droop control, the reactive power is outputted to compensate the voltage of the bus and keep a voltage balance. Control of compensating the voltage of the bus by mean of the droop control is described in detail with reference to the drawings hereinafter.

Figure 5:
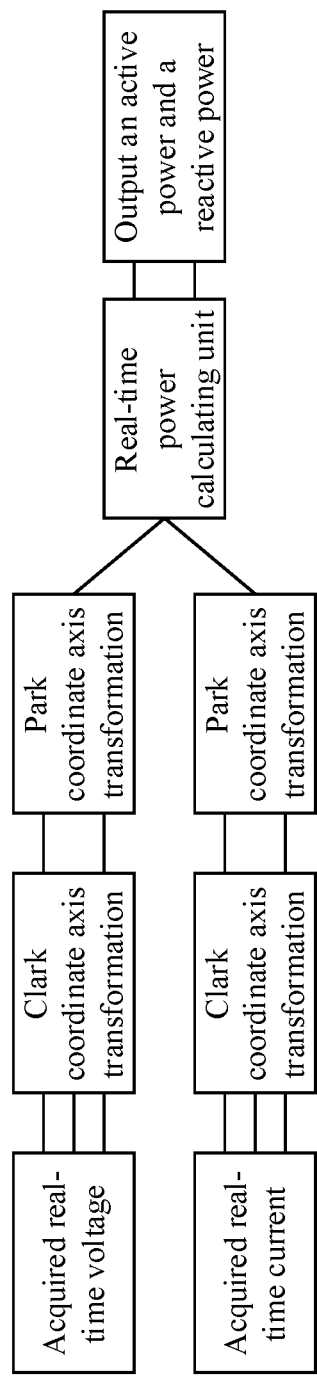
FIG. 5 is a block diagram of a real-time power calculating unit of a micro-grid dynamic stability control device according to an exemplary embodiment of the present disclosure.

FIG. 5 is a block diagram of a real-time power calculating unit of a micro-grid dynamic stability control device 127 according to an exemplary embodiment of the present disclosure. The real-time voltage and the real-time current of the 400V bus may be acquired by the micro-grid dynamic stability control device 127. Clarke coordinate axis transformation and Park coordinate axis transformation are performed on the acquired real-time voltage and the real-time current. The real-time voltage and the real-time current after performing the axis transformation are inputted to the real-time power calculating unit. The real-time power calculating unit may calculate a real-time power of the 400V bus and output an active power and a reactive power of the 400V bus.

Figure 6:
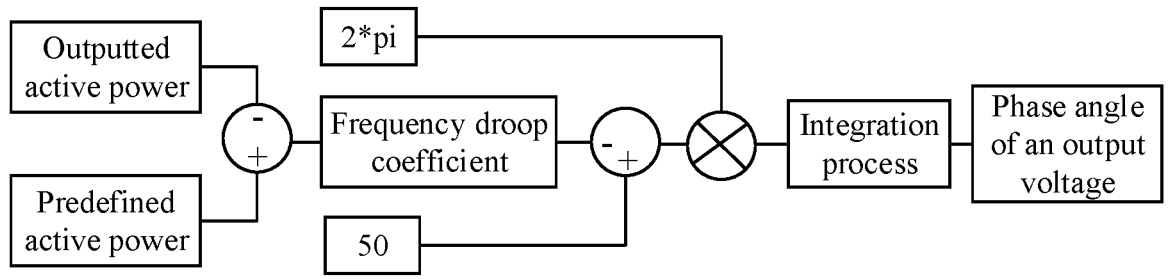
FIG. 6 is a block diagram of a phase angle calculating unit of a micro-grid dynamic stability control device according to an exemplary embodiment of the present disclosure.
Figure 7:
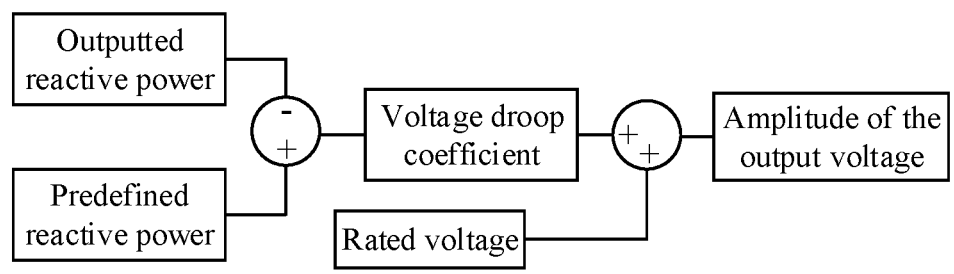
FIG. 7 is a block diagram of a voltage amplitude calculating unit of a micro-grid dynamic stability control device according to an exemplary embodiment of the present disclosure.

FIG. 6 is a block diagram of a phase angle calculating unit of a micro-grid dynamic stability control device 127 according to an exemplary embodiment of the present disclosure. FIG. 7 is a block diagram of a voltage amplitude calculating unit of a micro-grid dynamic stability control device 127 according to an exemplary embodiment of the present disclosure.

FIG. 6 is a block diagram showing that a phase angle is calculated based on the active power outputted by the real-time power calculating unit and a predefined active power. The predefined active power is the active power corresponding to a state at the point A in FIG. 4. A frequency droop coefficient is a slope of a curve in a schematic graph of a frequency droop control shown in FIG. 4, which is Δf/ΔP. Then, the phase angle is outputted after 2π×(50-frequency droop coefficient) is processed by an integration process. The phase calculation in the droop control does not include a phase locked loop process, that is the micro-grid dynamic stability control device 127 may not be affected by a frequency signal of the 400V bus when calculating the phase angle, and a predefined frequency (such as 50 Hz) is used to output a standard phase angle through the integration process.

FIG. 7 is a block diagram showing that a voltage amplitude is calculated based on the reactive power outputted by the real-time power calculating unit and a predefined reactive power. The predefined reactive power is a reactive power corresponding to the state at the point A in FIG. 3. The voltage droop coefficient is a slope of a curve in a schematic graph of a voltage droop control shown in FIG. 3, which is ΔV/ΔQ. The amplitude of the voltage is determined mainly based on a rated voltage of $V_0$, that is, the amplitude of the voltage outputted in the voltage droop control fluctuates at the rated voltage.

Figure 8:
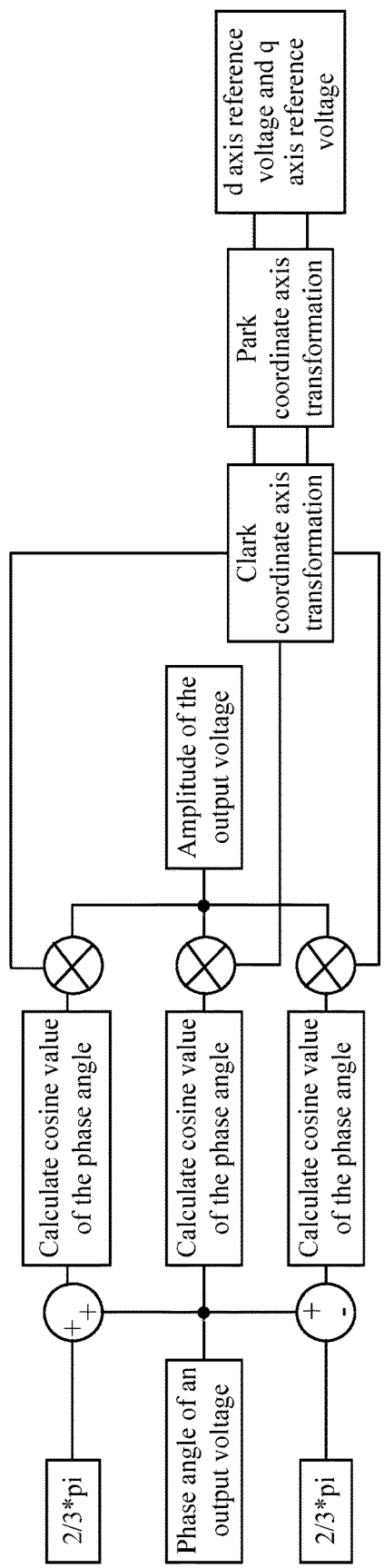
FIG. 8 is a block diagram of a reference voltage calculating unit of a micro-grid dynamic stability control device according to an exemplary embodiment of the present disclosure.

FIG. 8 is a block diagram of a reference voltage calculating unit of a micro-grid dynamic stability control device 127 according to an exemplary embodiment of the present disclosure. Cosine value of each of the outputted phase angle, the outputted phase angle+⅔π, the outputted phase angle−⅔π is calculated based on the outputted phase angle, and each cosine value is multiplied by the amplitude of the output voltage. Clarke coordinate axis transformation and Park coordinate axis transformation are performed on the multiplying results to obtain d axis reference voltage and q axis reference voltage.

Figure 9:
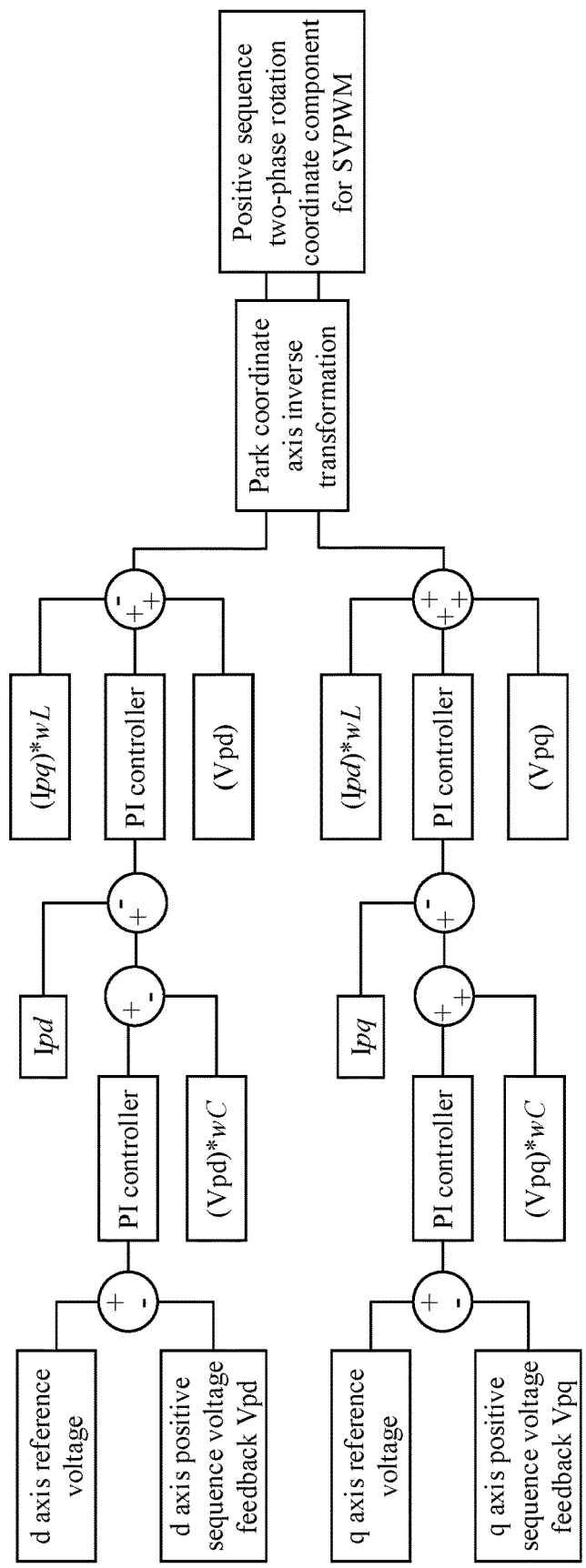
FIG. 9 is a block diagram of a double loop control strategy of positive sequence voltage outer loop and current inner loop according to an exemplary embodiment of the present disclosure.

FIG. 9 is a block diagram of a double loop control strategy of positive sequence voltage outer loop and current inner loop according to an exemplary embodiment of the present disclosure. In the control strategy, positive sequence extraction is performed on the acquired real-time voltage to obtain a d axis positive sequence voltage feedback Vpd and a q axis positive sequence voltage feedback Vpq, and a positive sequence two-phase rotation coordinate component for space vector pulse width modulation (SVPWM) is obtained through the double loop control strategy and Park coordinate axis inverse transformation. wC represents a reactance related to capacitance, and wL represents a reactance related to the inductance.

Figure 10:
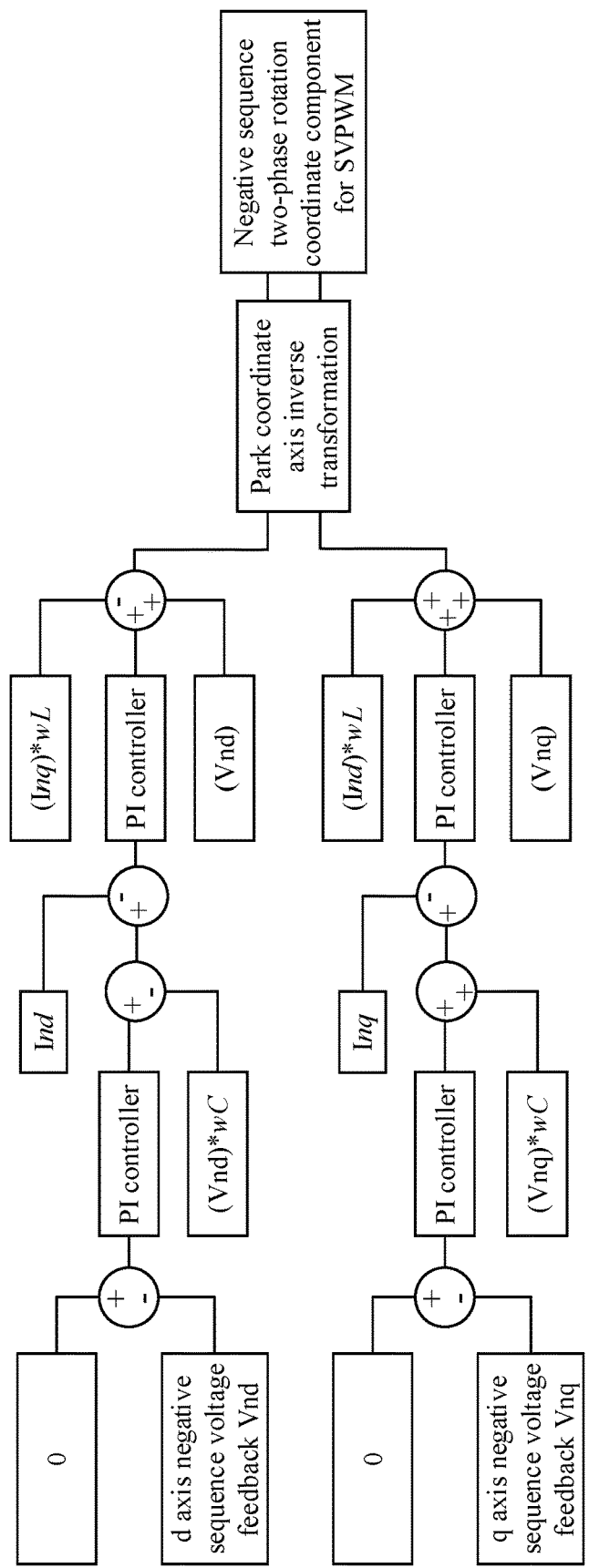
FIG. 10 is a block diagram of a double loop control strategy of negative sequence voltage outer loop and current inner loop according to an exemplary embodiment of the present disclosure.

FIG. 10 is a block diagram of a double loop control strategy of negative sequence voltage outer loop and current inner loop according to an exemplary embodiment of the present disclosure. In the control strategy, negative sequence extraction is performed on the acquired real-time voltage to obtain a d axis negative sequence voltage feedback Vnd and a q axis negative sequence voltage feedback Vnq, and a negative sequence two-phase rotation coordinate component for space vector pulse width modulation (SVPWM) is obtained through the double loop control strategy and Park coordinate axis inverse transformation.

The positive sequence two-phase rotation coordinate component and negative sequence two-phase rotation coordinate component for SVPWM may compensate unbalance of the voltage, so that the positive sequence component of the voltage of the system is in a predefined range, and the negative sequence component of the voltage of the system is offset.

As described above, in an operation process of the micro-grid, the micro-grid dynamic stability control device 127 monitors the voltage and the current of the 400V bus in real-time and calculates the real-time power factor, and compensates the voltage of the 400V bus according to the control method described in FIGS. 5 to 10. In a process in which each distributed power supply (the photovoltaic power station 122, the energy storage device 123, the micro gas turbine 124, the diesel engine 125, the factory 126) outputs the reactive power to the 400V bus in response to the control signal, the micro-grid dynamic stability control device 127 monitors the voltage and the current of the 400V bus and calculates the real-time power factor so as to provide the feedback signal to the central control device. And it is ensured that the reactive power outputted to the 400V bus by the each distributed power supply (the photovoltaic power station 122, the energy storage device 123, the micro gas turbine 124, the diesel engine 125, the factory 126) may make the voltage of the 400V bus be the rated power through the droop control. That is, the micro-grid dynamic stability control device 127 controls the reactive power outputted to the 400V bus by the each distributed power supply (the photovoltaic power station 122, the energy storage device 123, the micro gas turbine 124, the diesel engine 125, the factory 126) in real-time through the real-time monitoring and the droop control.

Furthermore, the micro-grid dynamic stability control device 127 may further control the amplitude and the frequency of the voltage of the micro-grid dynamic stability control device 127 during a switch of the micro-grid from a grid-connected state to an grid-disconnected state, thereby promoting the switch of the micro-grid from the grid-connected state to the grid-disconnected state and increasing the switch speed.

Figure 11:
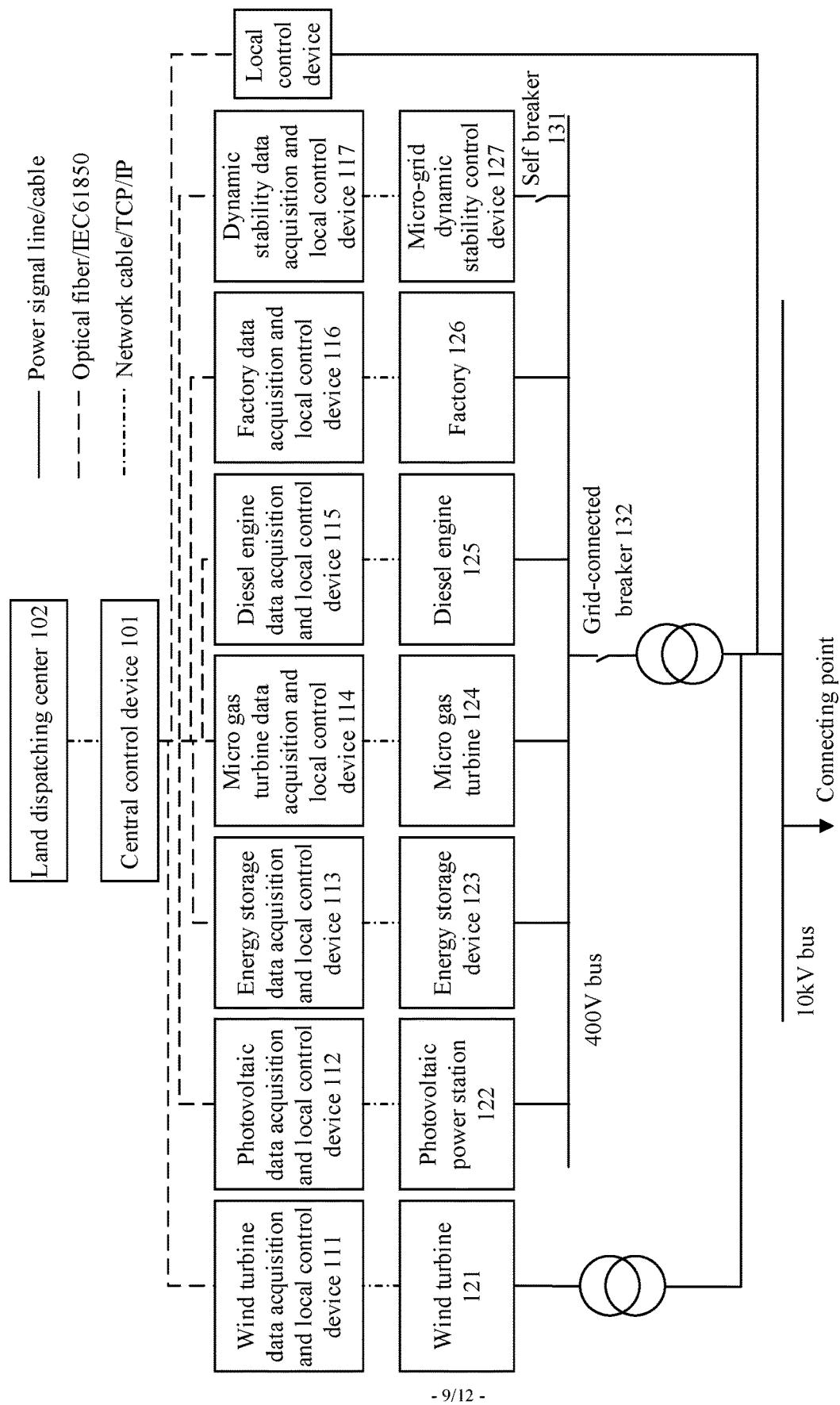
FIG. 11 is a block diagram of a micro-grid dynamic stability control system according to an exemplary embodiment of the present disclosure.

FIG. 11 is a block diagram of a micro-grid dynamic stability control system according to an exemplary embodiment of the present disclosure. As shown in FIG. 11, there is a self breaker 131 between the micro-grid dynamic stability control device 127 and the 400V bus, and there is a grid-connected breaker 132 of the whole micro-grid system under grid-connecting points of the 400V bus. In the present exemplary embodiment, a grid-disconnected state of the micro-grid dynamic stability control device 127 is a state in which the self breaker 131 is broken and the grid-connected breaker 132 is connected, the micro-grid dynamic stability control device 127 is disconnected from the 400V bus, that is, the micro-grid dynamic stability control device 127 and the micro-grid system are disconnected from the grid, and the micro-grid dynamic stability control device 127 is in an isolated state.

The switch between the grid-connected state and the grid-disconnected state of the micro-grid dynamic stability control device 127 is controlled by the central control device 101. In a case that the switch between the grid-connected state and the grid-disconnected state of the micro-grid dynamic stability control device 127 is not controlled by the central control device 101, the micro-grid dynamic stability control device 127 may fail, the droop control shown in FIGS. 5 to 10 is required to control the voltage of the micro-grid dynamic stability control device 127 to avoid serious consequences, and failure information is cleared before being connected to the grid next time.

Figure 12:
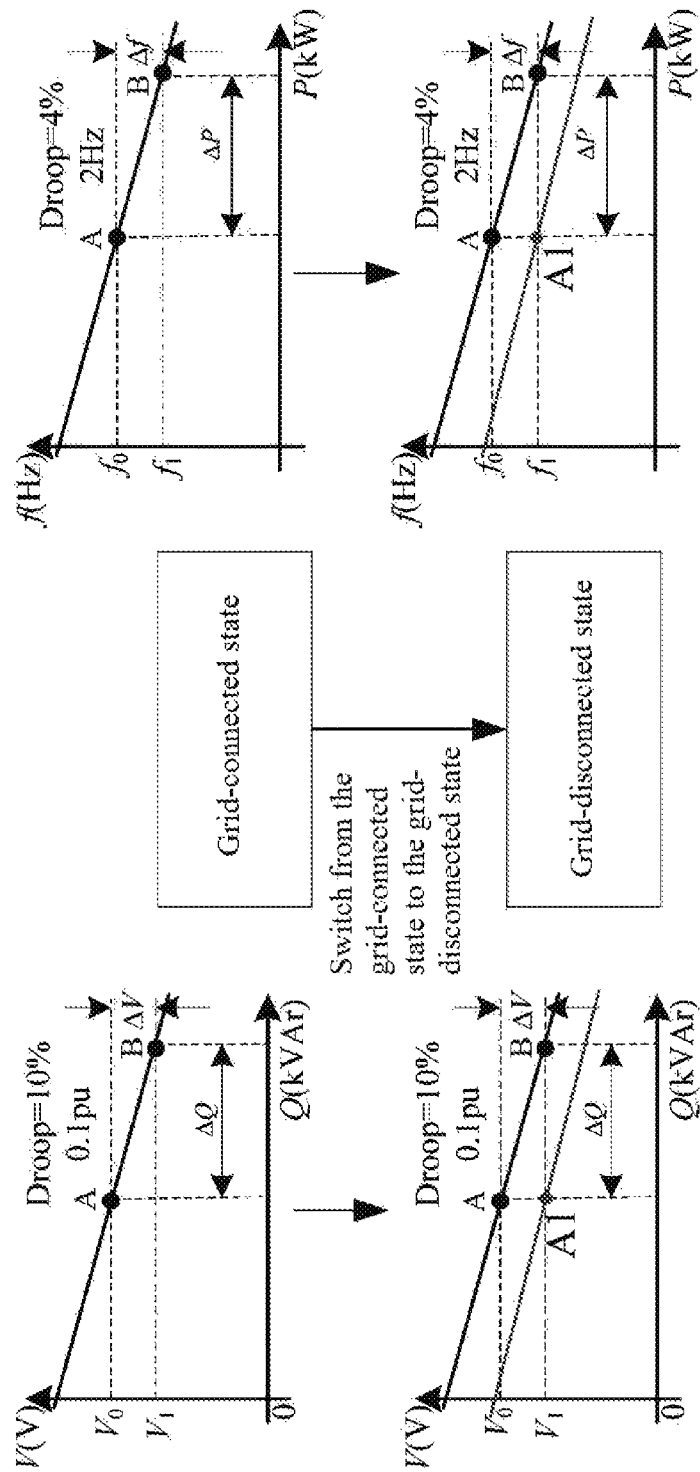
FIG. 12 is a diagram showing an operation state of a micro-grid dynamic stability control device when switching from a grid-connected state to a grid-disconnected state according to an exemplary embodiment of the present disclosure.

FIG. 12 is diagram showing operation states of a micro-grid dynamic stability control device 127 switching from a grid-connected state to grid-disconnected state according to an exemplary embodiment of the present disclosure. As shown in FIG. 12, under the grid-connected state, a voltage droop control curve and a frequency droop control curve of the micro-grid dynamic stability control device 127 are shown in the upper left drawing and the upper right drawing in FIG. 12 respectively. The operation state of the micro-grid dynamic stability control device 127 is shown as the state at the point A (the voltage corresponding to the point A is the rated voltage of the 400V bus which is $V_0$, the frequency corresponding to the point A is the frequency of the 400V bus which is $f_0$).

After the micro-grid dynamic stability control device 127 switches from the grid-connected state to the grid-disconnected state, the voltage droop control curve and the frequency droop control curve of the micro-grid dynamic stability control device 127 are shown in the lower left drawing and the lower right drawing in FIG. 12 respectively. The operation state of the micro-grid dynamic stability control device 127 is shown as the state at the point A1 (the voltage corresponding to the point A1 is $V_1$, the frequency corresponding to the point A is $f_1$). When the grid-connected state is switched to the grid-disconnected state, the operation state of the micro-grid dynamic stability control device 127 changes from the state at the point A to the state at the point A1, each of the voltage droop control curve and the frequency droop control curve changes from a curve passing through the point A to a curve passing through the point A1. As shown in FIG. 12, the amplitude of the voltage of the micro-grid dynamic stability control device 127 decreases by $\Delta V$, the frequency of the voltage of the micro-grid dynamic stability control device 127 decreases by $\Delta f$. At the same time, the micro-grid dynamic stability control device 127 performs the droop control shown in FIGS. 5 to 10, to compensate the voltage of the micro-grid dynamic stability control device 127, thereby making the voltage of the micro-grid dynamic stability control device 127 reach a stable state rapidly.

In a case that the switch from the grid-connected state to the grid-disconnected state of the micro-grid dynamic stability control device 127 is not controlled by the central control device 101, the micro-grid dynamic stability control system may fail, the operation state of the micro-grid dynamic stability control system may change from the state at the point A to the state at the point B. At this time, the micro-grid dynamic stability control device 127 may keep the voltage and the frequency by means of the droop control to avoid an excessive drop in the voltage and the frequency, and may clear the failure information before being connected to the grid next time.

When the micro-grid dynamic stability control device 127 switches from the grid-disconnected state to the grid-connected state, the self breaker 131 is connected, and the grid-connected breaker is connected, so that the micro-grid dynamic stability control device 127 is connected to the 400V bus, that is, the micro-grid dynamic stability control device 127 and the micro-grid system are connected to the grid, thereby making the micro-grid system be in the grid-connected state.

Figure 13:
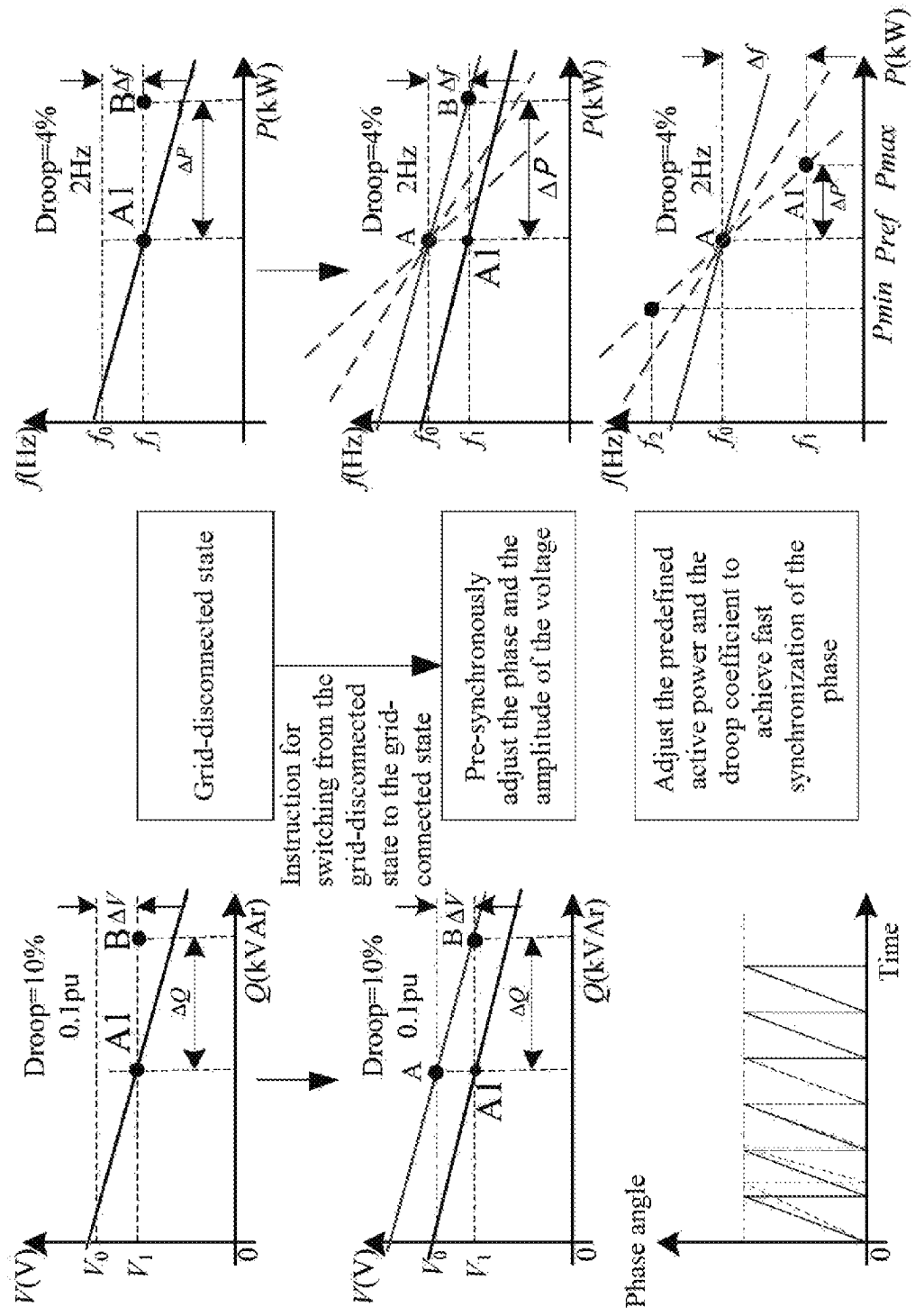
FIG. 13 is a diagram showing an operation state of a micro-grid dynamic stability control device when switching from a grid-disconnected state to a grid-connected state according to an exemplary embodiment of the present disclosure.

FIG. 13 is diagram showing operation states of a micro-grid dynamic stability control device 127 switching from a grid-disconnected state to grid-connected state according to an exemplary embodiment of the present disclosure. As shown in FIG. 13, under the grid-disconnected state, a voltage droop control curve and a frequency droop control curve of the micro-grid dynamic stability control device 127 are shown in the upper left drawing and the upper right drawing in FIG. 13 respectively. The operation state of the micro-grid dynamic stability control device 127 is shown as the state at the point A1.

After the micro-grid dynamic stability control device 127 switches from the grid-disconnected state to the grid-connected state, the voltage droop control curve and the frequency droop control curve of the micro-grid dynamic stability control device 127 are shown in the middle left drawing and the middle right drawing in FIG. 13 respectively. The operation state of the micro-grid dynamic stability control device 127 changes from the state at point A1 to the state at point A. That is, when the grid-disconnected state is switched to the grid-connected state, each of the voltage droop control curve and the frequency droop control curve changes from a curve passing through the point A1 to a curve passing through the point A. As shown in FIG. 13, the amplitude of the voltage of the micro-grid dynamic stability control device 127 increases by $\Delta V$, the frequency of the voltage of the micro-grid dynamic stability control device 127 increases by $\Delta f$. At the same time, the micro-grid dynamic stability control system performs the droop control shown in FIGS. 5 to 10, to compensate the voltage of the micro-grid dynamic stability control device 127, thereby making the voltage of the micro-grid dynamic stability control device 127 reach a stable state rapidly.

In a case that the switch from the grid-disconnected state to the grid-connected state of the micro-grid dynamic stability control device 127 is not controlled by the central control device 101, the micro-grid dynamic stability control device 127 may fail, the micro-grid dynamic stability control device 127 may keep the voltage and the frequency by means of the droop control shown in FIGS. 5 to 10, to avoid an excessive rise in the voltage and the frequency and serious consequences caused by the excessive current for the short moment. The failure information may be cleared before being connected to the grid next time.

During the process in which the micro-grid dynamic stability control device 127 switches from the grid-disconnected state to the grid-connected state, parameters such as the frequency and the phase of the voltage of the micro-grid dynamic stability control device 127 are different from that of the voltage of the 400V bus, in order to increase a speed of switching from the grid-disconnected state to the grid-connected state, the method of changing the droop coefficient and the predefined power may be adopted.

Changing the droop coefficient of the frequency droop control curve means to change the slope of the droop control curve. An absolute value of the slope of the droop control curve is increased, therefore, $\Delta f$ is increased. That is, the frequency difference between the 400V bus and the micro-grid dynamic stability control system increases, thereby increasing a speed of tracking a phase of the voltage of the 400V bus by the micro-grid dynamic stability control device 127.

Optionally, the speed of switching from the grid-disconnected state to the grid-connected state may be further increased by changing the predefined power. For example, since the slope of the frequency droop control curve is negative, when the predefined power is decreased, $\Delta f$ is increased, that is, the frequency difference between the 400V bus and the micro-grid dynamic stability control device 127 is increased, thereby increasing a speed of tracking a phase of the voltage of the 400V bus by the micro-grid dynamic stability control device 127.

As shown in a lower right drawing in FIG. 13, which shows a control curve in which a speed of switching from the grid-disconnected state to the grid-connected state of the micro-grid dynamic stability control device 127 is increased by changing the droop coefficient and the predefined power. In FIG. 13, the frequency corresponding to the point A1 is $f_1$, the active power corresponding to the point A1 is Pmax; the frequency corresponding to the point A is $f_0$, the active power corresponding to the point A is Pref; the active power is adjusted between Pmin and Pmax. As shown in FIG. 13, the slope of the frequency droop control curve is adjusted to be $(f_2-f_1)/(Pmin-Pmax)$.

As shown in a lower left drawing in FIG. 13, the micro-grid dynamic stability control device 127 keeps the same phase as the 400V bus through the method of phase tracking. Furthermore, the micro-grid dynamic stability control device 127 further includes a filtering system configured to filter a 13th harmonic, the filtering system may filter a higher harmonic of the voltage of the bus to maintain an accuracy of the phase tracking.

Figure 14:
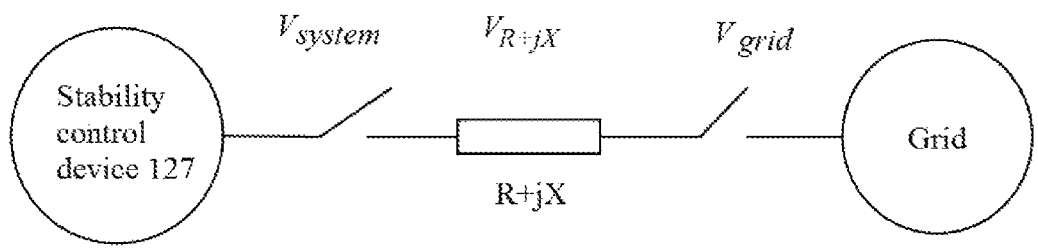
FIG. 14 is a diagram showing a principle of tracking a phase of a 400V bus by a micro-grid dynamic stability control device according to an exemplary embodiment of the present disclosure.
Figure 15:
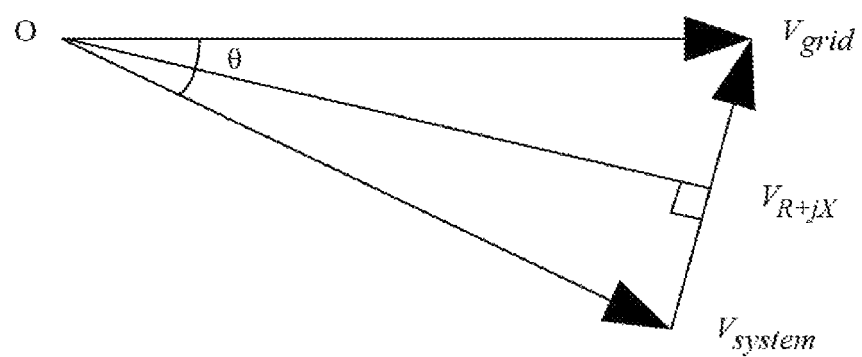
FIG. 15 is a schematic phase diagram of tracking a phase of a 400V bus by a micro-grid dynamic stability control device according to an exemplary embodiment of the present disclosure.

FIG. 14 is a diagram showing a principle of tracking a phase of a 400V bus by a micro-grid dynamic stability control device 127 according to an exemplary embodiment of the present disclosure. FIG. 15 is a schematic phase diagram of tracking a phase of a 400V bus by a micro-grid dynamic stability control device 127 according to an exemplary embodiment of the present disclosure.

As shown in the drawings, an impedance angle phase between the micro-grid dynamic stability control device 127 and the 400V bus is $V_{R+jX}$, the phase $V_{system}$ of the voltage outputted by the micro-grid dynamic stability control device 127 tracks phase $V_{grid}$ of the voltage of the 400V bus with the victor addition, and is consistent with the $V_{grid}$, that is, $V_{system}+V_{R+jX}=V_{grid}$.

Furthermore, when the micro-grid dynamic stability control device 127 switches from the grid-disconnected state to the grid-connected state, a maximum current at a switch instant has to be determined, to facilitate the control of switch phase angle and choosing devices in the grid based on the maximum current. As shown in FIG. 15, the maximum current $|I_{R+jX}|_{max}$ may be determined according to the following formula:

$$|V_{R+jX}| = 2 \cdot V_{grid} \cdot \sin\left(\frac{1}{2}\theta\right)$$
$$\approx V_{grid} \cdot \theta$$
$$|I_{R+jX}|_{max} \approx V_{grid} \cdot \theta / |R + jX|$$

The micro-grid dynamic stability control device 127 realizes the dynamic reactive compensation and the power factor adjustment on the micro-grid system through the droop control. The stability of the voltage of the bus in the normal operation is guaranteed and the power quality is improved by adjusting the frequency within the frequency fluctuation rate range of −10% to +10% and adjusting the voltage within the voltage fluctuation rate range of −10% to 7%. At the same time, the micro-grid dynamic stability control device 127 may compensate the voltage and adjust the power factor during the switch between the grid-disconnected state and the grid-connected state by means of the droop control, to dynamically adjust the active power of the micro-grid dynamic stability control device 127 within the range of −200 kW to 200 kW and adjust the reactive power of the micro-grid dynamic stability control device 127 within the range of −200 kVA to 200 kVA. The speed of tracking phase may be increased by changing the droop coefficient and processing voltage or current harmonics below 13th harmonic, thereby increasing the speed of switching between the grid-disconnected state and the grid-connected state, and making the time of switching between the grid-disconnected state and the grid-connected state be less than 10 ms.

Although exemplary embodiments are described above, these embodiments are not intended to describe all possible forms of the disclosure. Specifically, the words used in the specification are words of description rather than limitation, and it is understood that various modifications may be made without departing from the spirit and scope of the disclosure. In addition, the features of various implemented embodiments may be combined to form other embodiments of the disclosure.

The invention claimed is:

1. A micro-grid dynamic stability control system, comprising:
a micro-grid dynamic stability control device, configured to acquire a real-time voltage and a real-time current of a bus and calculate a power factor based on the real-time voltage and the real-time current;
a central control device, configured to receive the power factor and transmit a reactive power control instruction in a case that the power factor is lower than a predefined threshold; and
at least one local control device, configured to receive the reactive power control instruction and transmit a control signal to the micro-grid dynamic stability control device and at least one distributed power supply controlled by the at least one local control device, wherein the micro-grid dynamic stability control device, in response to the control signal, compensates the voltage of the bus by means of droop control, and the at least one distributed power supply, in response to the control signal, outputs a reactive power to the bus to increase the power factor of the bus.

2. The micro-grid dynamic stability control system according to claim 1, wherein the droop control performed by the micro-grid dynamic stability control device comprises:
calculating an active power and a reactive power based on the real-time voltage and the real-time current; and
calculating a phase angle of an output voltage of the micro-grid dynamic stability control device based on the calculated active power and a predefined active power, and calculating an amplitude of the output voltage based on the calculated reactive power and a predefined reactive power;
calculating a d axis reference voltage and a q axis reference voltage based on the phase angle of the output voltage;
calculating a positive sequence component for space vector pulse width modulation based on the d axis reference voltage, a d axis positive sequence voltage feedback, the q axis reference voltage and a q axis positive sequence voltage feedback to make a positive sequence component of the voltage of the bus be in a rated range, wherein the d axis positive sequence voltage feedback and the q axis positive sequence voltage feedback are positive sequence components obtained by performing positive sequence extraction on the real-time voltage;

calculating a negative sequence component for the space vector pulse width modulation based on a d axis negative sequence voltage feedback and a q axis negative sequence voltage feedback to compensate the voltage of the bus and eliminate a negative sequence component of the voltage of the bus, wherein the d axis negative sequence voltage feedback and the q axis negative sequence voltage feedback are negative sequence components obtained by performing negative sequence extraction on the real-time voltage.

3. The micro-grid dynamic stability control system according to claim 2, wherein the amplitude of the output voltage depends on a rated voltage of the bus.

4. The micro-grid dynamic stability control system according to claim 1, wherein an amplitude of an output voltage of the micro-grid dynamic stability control device decreases by a predefined voltage difference and a frequency of the output voltage decreases by a predefined frequency difference, when the micro-grid dynamic stability control device switches from a grid-connected state to a grid-disconnected state.

5. The micro-grid dynamic stability control system according to claim 1, wherein an amplitude of an output voltage of the micro-grid dynamic stability control device increases by a predefined voltage difference and a frequency of the output voltage increases by a predefined frequency difference, when the micro-grid dynamic stability control device switches from a grid-disconnected state to a grid-connected state.

6. The micro-grid dynamic stability control system according to claim 5, wherein, when the micro-grid dynamic stability control device switches from the grid-disconnected state to the grid-connected state, the micro-grid dynamic stability control device increases a frequency difference between a frequency of the voltage of the bus and the frequency of the output voltage of the micro-grid dynamic stability control device, to increase a speed of tracking a phase of the voltage of the bus by a phase of the output voltage of the micro-grid dynamic stability control device.

7. The micro-grid dynamic stability control system according to claim 5, wherein when the micro-grid dynamic stability control device switches from the grid-disconnected state to the grid-connected state, the micro-grid dynamic stability control device decreases a predefined active power to increase a speed of switching from the grid-disconnected state to the grid-connected state.

8. The micro-grid dynamic stability control system according to claim 1, wherein the micro-grid dynamic stability control device further comprises a filtering system configured to filter a higher harmonic of the voltage of the bus.

9. The micro-grid dynamic stability control system according to claim 1, wherein the at least one local control device communicates with the at least one distributed power supply and the micro-grid dynamic stability control device through a transmission control protocol.

10. The micro-grid dynamic stability control system according to claim 1, wherein the at least one local control device communicates with the central control device according to a global common standard for power system automation field.

11. A micro-grid dynamic stability control method, comprising:

acquiring, by a micro-grid dynamic stability control device, a real-time voltage and a real-time current of a bus and calculating, by the micro-grid dynamic stability control device, a power factor based on the real-time voltage and the real-time current; and transmitting, by a central control device, a reactive power control instruction to control the micro-grid dynamic stability control device to compensate the voltage of the bus by means of droop control and to control at least one distributed power supply to output a reactive power to the bus to increase the power factor, in a case that the power factor is lower than a predefined threshold.

12. The micro-grid dynamic stability control method according to claim 11, wherein the droop control comprises:

calculating an active power and a reactive power based on the real-time voltage and the real-time current; and calculating a phase angle of an output voltage based on the calculated active power and a predefined active power, and calculating an amplitude of the output voltage based on the calculated reactive power and a predefined reactive power;

calculating a d axis reference voltage and a q axis reference voltage based on the phase angle of the output voltage;

calculating a positive sequence component for space vector pulse width modulation based on the d axis reference voltage, a d axis positive sequence voltage feedback, the q axis reference voltage and a q axis positive sequence voltage feedback to make a positive sequence component of the voltage of the bus be in a rated range, wherein the d axis positive sequence voltage feedback and the q axis positive sequence voltage feedback are positive sequence components obtained by performing positive sequence extraction on the real-time voltage;

calculating a negative sequence component for the space vector pulse width modulation based on a d axis negative sequence voltage feedback and a q axis negative sequence voltage feedback to compensate the voltage of the bus and eliminate a negative sequence component of the voltage of the bus, wherein the d axis negative sequence voltage feedback and the q axis negative sequence voltage feedback are negative sequence components obtained by performing negative sequence extraction on the real-time voltage.

13. The micro-grid dynamic stability control method according to claim 12, wherein the amplitude of the output voltage depends on a rated voltage of the bus.

14. The micro-grid dynamic stability control method according to claim 11, wherein an amplitude of an output voltage of the micro-grid dynamic stability control device decreases by a predefined voltage difference and a frequency of the output voltage decreases by a predefined frequency difference, when the micro-grid dynamic stability control device switches from a grid-connected state to a grid-disconnected state.

15. The micro-grid dynamic stability control method according to claim 11, wherein an amplitude of an output voltage of the micro-grid dynamic stability control device increases by a predefined voltage difference and a frequency of the output voltage increases by a predefined frequency difference, when the micro-grid dynamic stability control device switches from a grid-disconnected state to a grid-connected state.

16. The micro-grid dynamic stability control method according to claim 15, wherein, when the micro-grid dynamic stability control device switches from the grid-disconnected state to the grid-connected state, the micro-grid dynamic stability control device increases a frequency difference between a frequency of the voltage of the bus and the frequency of the output voltage of the micro-grid dynamic stability control device, to increase a speed of tracking a phase of the voltage of the bus by a phase of the output voltage of the micro-grid dynamic stability control device.

17. The micro-grid dynamic stability control method according to claim 15, wherein when the micro-grid dynamic stability control device switches from the grid-disconnected state to the grid-connected state, the micro-grid dynamic stability control device decreases a predefined active power to increase a speed of switching from the grid-disconnected state to the grid-connected state.

* * * * *